United States Patent
Robbins et al.

(10) Patent No.: US 11,254,619 B2
(45) Date of Patent: Feb. 22, 2022

(54) DRY COMPOSITION INCLUDING EFFERVESCENT AGENTS, BIOSTIMULANT, AND PLANT NUTRIENT

(71) Applicants: Jeffrey Hanson Robbins, San Diego, CA (US); Ariel Nehemiah Tenenbaum, San Diego, CA (US)

(72) Inventors: Jeffrey Hanson Robbins, San Diego, CA (US); Ariel Nehemiah Tenenbaum, San Diego, CA (US)

( * ) Notice: Subject to any disclaimer, the term of this patent is extended or adjusted under 35 U.S.C. 154(b) by 117 days.

(21) Appl. No.: 16/382,591

(22) Filed: Apr. 12, 2019

(65) Prior Publication Data
US 2020/0325079 A1    Oct. 15, 2020

(51) Int. Cl.
| | | |
|---|---|---|
| *C05D 1/00* | (2006.01) | |
| *C05B 7/00* | (2006.01) | |
| *C05C 9/00* | (2006.01) | |
| *C05G 5/20* | (2020.01) | |
| *B01J 2/00* | (2006.01) | |
| *C05B 17/00* | (2006.01) | |
| *A01G 31/02* | (2006.01) | |

(52) U.S. Cl.
CPC .............. *C05B 7/00* (2013.01); *B01J 2/00* (2013.01); *C05C 9/00* (2013.01); *C05D 1/00* (2013.01); *C05G 5/20* (2020.02); *A01G 31/02* (2013.01); *C05B 17/00* (2013.01)

(58) Field of Classification Search
CPC ... C05B 7/00; C05B 17/00; B01J 2/00; C05D 1/00; C05G 5/20; C05C 9/00; A01G 31/02
See application file for complete search history.

(56) References Cited

U.S. PATENT DOCUMENTS

| | | | |
|---|---|---|---|
| 3,197,302 A | 7/1965 | Macbride | |
| 5,034,045 A | 7/1991 | Alexander | |
| 5,503,651 A | 4/1996 | Kloepper | |
| 6,565,881 B1 | 5/2003 | Nurnberg | |
| 9,314,031 B2 | 4/2016 | Haas | |
| 10,172,793 B2 | 1/2019 | Henriksen | |
| 2003/0170301 A1 | 9/2003 | Wenling | |
| 2004/0035162 A1 | 2/2004 | Williams | |
| 2004/0200248 A1* | 10/2004 | Kirkegaard | C05C 3/00 71/28 |

(Continued)

FOREIGN PATENT DOCUMENTS

| | | |
|---|---|---|
| CN | 102648715 A * | 8/2012 |
| CN | 102823589 A | 6/2014 |

(Continued)

OTHER PUBLICATIONS

Nair, Sneha S., and G. P. Brahmaprakash. "Effect of effervescent biofertilizer consortial tablets on growth of tomato (*Lycopersicon esculentum* Mill.)." Int. J. Curr. Microbiol. App. Sci 6.9 (2017): 615-623. (Year: 2017).*

(Continued)

*Primary Examiner* — Jennifer A Smith

(57) ABSTRACT

A method for fabricating a dry composition is disclosed including combining a solid carbonate or a solid bicarbonate compound, a solid acid yielding compound, a biostimulant, and a plant nutrient. The dry composition may be processed into a tablet, dry powder, meal, or pellets and produce effervescence when a liquid, such as water or a water-based liquid is mixed with the dry composition.

20 Claims, 1 Drawing Sheet

(56) References Cited

U.S. PATENT DOCUMENTS

| | | | |
|---|---|---|---|
| 2005/0022570 A1 | 2/2005 | Duarte-MacDonald | |
| 2016/0304407 A1 | 10/2016 | Bame | |
| 2016/0347675 A1 | 12/2016 | Roach | |
| 2018/0244589 A1 | 8/2018 | Roach | |

FOREIGN PATENT DOCUMENTS

| | | | | |
|---|---|---|---|---|
| CN | 104365592 | A | * | 2/2015 |
| CN | 105130677 | A | | 12/2015 |
| CN | 106588358 | A | * | 4/2017 |
| CN | 106631284 | A | | 5/2017 |
| CN | 106673840 | A | | 5/2017 |
| CN | 107244966 | A | * | 10/2017 |
| DE | 2513696 | A1 | | 10/1975 |
| IN | 201721021523 | A | * | 6/2017 |
| KR | 20180074390 | A | * | 7/2018 |
| WO | WO-2017060861 | | | 10/2015 |

OTHER PUBLICATIONS

Kurdish, I. K., and L. V. Titova. "Granular preparations of Azotobacter containing clay minerals." Applied Biochemistry and Microbiology 36.4 (2000): 418-420. (Year: 2000).*

Zhang H. Kim MS, Krishnamachari V, Payton P, Sun Y, GrimsonM, Farag MA, Ryu CM, Allen R, Melo IS, Pare' PW: Rhizobacterial volatile emissions regulate auxin homeostasis anc cell expansion in *Arabidopsis*. Planta 2007, 226 (pp. 839-851).

Lugenberg BJJ, Kamilova F: Plant-growth-promoting rhizobacteria. Ann Rev Microbiol 2009, 63 (pp. 541-556).

Tsavkelova EA, Klimova SY, Cherdyntseva TA, Netrusov AI: Microbial producers of plant growth stimulators and their practical use: a review. Appl Biochem Microbiol 2006, 42 (pp. 117-126).

Spaepen S, Vanderleyden J, Remans R: Indole-3-acetic acid in microbiol and microorganism-plant signaling. FEMS Microbiol Rev 2007, 31 (pp. 425-448).

Arkhipova TN, Prinsen E, Veselov SU, Martinenko EV, Melentiev AI, Kudoyarova GR: Cytokinin producing bacteria enchance plant growth in drying soil. Plant Soil 2007, 292 (pp. 305-315).

Ortiz-Castro R, Valencia-Cantero E, Lo' pez-Bucio J: Plant growth promotion by Bacillus megaterum involves cytokinin signaling. Plant Signal Behav 2008, 3 (pp. 263-265).

Keith Jones. "First U.S. Definition of Plant Biostimulants" https://www.businesswire.com/news/home/20180417006140/en/U.S-Definition-Plant-Biostimulants (pp. 1-2). Archive date Apr. 17, 2018.

Solutions 4Earth, LLC. Komodo Pro. http://solutions4earth.com/products/komodo-pro/ (p. 1). Obtained Jan. 25, 2019.

CUSTOMBIO. Biota Max™. http://www.biotamax.com/BiotaMax.html (p. 1). Obtained Jan. 25, 2019.

Alka-Seltzer Gold- alka-seltzer gold tablet, effervescent. <https://dailymed.nlm.nih.gov/dailymed/fda/fdaDrugXsl.cfm?setid=0824bedb-413b-2fa0-e054-00144ff88e88&type=display> Effective Time: May 5, 2017.

Kelli's Gifts. "Wholesale Single Dose Over the Counter Medicine Display" <https://www.kellisgifts.com/single-dose-over-the-counter-medicine-display/> Nov. 15, 2017.

Elliott. John. "10 Great Gardening Tips & Ideas" English Country Garden .http://www.english-country-garden.com/articles/gardening-tips-and-ideas.htm> Apr. 26, 2017.

Chen, Yueh-Huey, and Jing-Fun Yaung. "Alka-Seltzer Fizzing-Determination of Percent by Mass of NaHCO3 in Alka-Seltzer Tablets an Undergraduate General Chemistry Experiment." Journal of chemical education 79.7 (2002): 848.

Ruth, Cororan Printing "5 Tips for better retail hanging display packaging design" Mar. 23, 2018 <https://corcoranprinting.com/tips-for-printed-retail-display-packaging/> (Year: 2018).

Amazon, Calgon Take Me Away! Lavender & Honey Moisturizing Bath Soak Fizzies Bombs 8 • 2.1 Oz Balls Date First Available : Apr. 20, 2017 <https://www/amazon.com/Calgon-Lavender-Honey-Moisturizing-Fizzies/dp/B071D7H73R/ref=sr_1_56> (Year: 2017).

Effeer-K 10 mEq and 20 mEq Tablets (Effervescent Potassium Bicarbonate/ Citric Acid Tablets for OralSolution, USP) Revised: Dec. 2019 <https://dailymed.nlm.nih.gov/dailymed/fda/fdaDrugXsl.cfm?setid=8889554b-ff0b-410e-8a09-61e7be3b496e&type=display> (Year: 2019).

Chun, Wesley. "Amino Acids as Plant Biostimulants" Grower's Secret. <https://growerssecret.com/amino-acids-as-biostimulants> Obtained: Jun. 22, 2021 (Year: 2021).

* cited by examiner

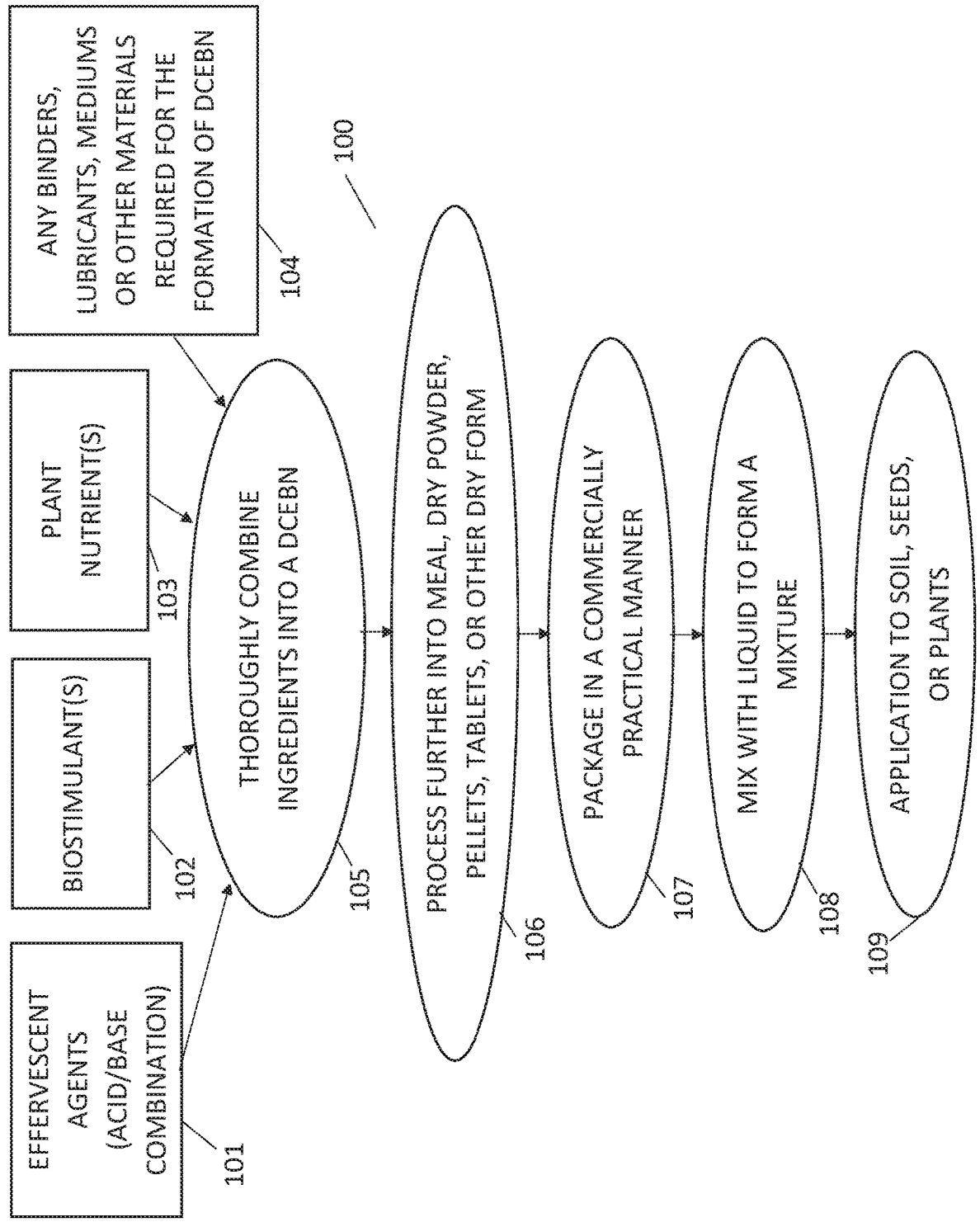

DRY COMPOSITION INCLUDING EFFERVESCENT AGENTS, BIOSTIMULANT, AND PLANT NUTRIENT

BACKGROUND OF THE INVENTION

1. Field of the Invention

The present invention relates to plant fertilizers, and more particularly, to a dry composition with effervescent agents, a biostimulant, and a plant nutrient and a method of making the same.

2. Background

Numerous fungi, bacteria, and other microorganisms that influence plant growth are known. Fungi may colonize plant roots and aid in the solubilization of macro and micro nutrients. More recently, a group of bacteria found in the root zone of plants collectively known as growth promoting rhizobacteria have been shown to improve yield, vigor, and in some cases confer disease resistance to a variety of plants. Fungi, bacteria, and other micro-organisms along with compounds isolated from said micro-organisms are sometimes referred to as biostimulants.

The combination of plant nutrients together with biostimulants may lead to a combined beneficial effect that is greater than the sum of their effect individually. For example, existing dry fertilizer products are available that include biostimulants. However, known dry fertilizers that have biostimulants do not adequately mix, dissolve or disperse when added to a liquid. Additionally, the resulting mixture, when applied, does not maximize even distribution or absorption into soil or plants or the like.

Accordingly, there is a need for a dry composition, that includes effervescent agents, a biostimulant, and a plant nutrient, that is rapidly dissolvable, increases absorption, and improves fertilizing effectivity.

SUMMARY

In one aspect, there is disclosed a method for fabricating a dry composition, comprising combining a solid carbonate compound or a solid bicarbonate compound, a solid acid yielding compound, a biostimulant, and a plant nutrient. The combining step may further comprise adding one of a lubricant, a binding agent and a medium. The method may further include processing the dry composition into one of a tablet, dry powder, meal and pellets. The method may further include mixing or dissolving the dry composition in a liquid, wherein the liquid is one of water and a water-based liquid.

An amount of effervescent agents including the solid carbonate or bicarbonate compound and a solid acid yielding compound, is between about 20% by mass to about 90% by mass. An amount of biostimulant is between about 0.1% by mass to about 70% by mass. An amount of the plant nutrient is between about 10% by mass to about 80% by mass. An amount of the solid acid yielding compound is between about 2% by mass to about 55% by mass. An amount of the solid carbonate compound is between about 4% by mass to about 52% by mass. An amount of the solid bicarbonate compound is between about 6% by mass to about 60% by mass. An amount of the solid carbonate or bicarbonate compound in combination is between about 4% by mass to about 60% by mass.

In another aspect, a dry composition is disclosed comprising a solid carbonate compound or a solid bicarbonate compound, a solid acid yielding compound, a biostimulant, and a plant nutrient.

BRIEF DESCRIPTION OF THE FIGURES

The invention may be better understood by referring to the following FIGURES. The components in the figures are not necessarily to scale, emphasis instead being placed upon illustrating the principles of the invention. In the FIGURES, like reference numerals designate corresponding parts throughout the different views.

FIG. 1 shows a method for fabricating a dry composition with effervescent agents, a biostimulant, and a plant nutrient in accordance with an embodiment.

DETAILED DESCRIPTION

Each of the additional features and teachings disclosed below can be utilized separately or in conjunction with other features and teachings to a method for fabricating a dry composition with effervescent agents, a biostimulant, and a plant nutrient (DCEBN). Representative examples of the present invention, which utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detailed description may not be necessary to practice the invention in the broadest sense and are instead taught merely to particularly describe representative examples of the present teachings.

Moreover, the various features of the representative examples and the dependent claims may be combined in ways that are not specifically and explicitly enumerated to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for original disclosure, as well as for the purpose of restricting the claimed subject matter.

It is expressly understood that the term "biostimulant" means a substance or microorganism that may enhance or benefit nutrient uptake, nutrient efficiency or efficacy, plant growth, cellular or hormonal activities, tolerance to abiotic or biotic stresses, tolerance to environmental stresses, disease or pest resistance, foliage or flower quality, or crop quality and yield.

A method for fabricating a DCEBN is disclosed. In one embodiment, the method may provide a DCEBN in a premeasured formulation that requires no agitation or stirring for mixing or dissolution in water. In one embodiment, a DCEBN may be in the form of any solid, including any powder, meal, pellet, or tablet. Binding agents, lubricants, mediums, or other ingredients may be used in forming the dry composition. In one embodiment, a DCEBN containing a solid carbonate or a bicarbonate compound, a solid acid yielding compound, a biostimulant, and a plant nutrient may be formed.

In one embodiment, the effervescent agents may be the combination of a solid carbonate or a bicarbonate compound, and a solid acid yielding compound. In one embodiment, the solid acid yielding compound may include sodium, be substantially sodium-free, sodium-free, organic or inorganic with sufficient strength to react with a solid carbonate or a bicarbonate compound to yield carbon dioxide ($CO_2$). In one embodiment, the solid acid yielding compound may include citric acid, tartaric acid, or oxalic acid. In another embodiment, the solid acid yielding compound may include solid inorganic acid salts including ammonium or potassium bisulfate, monohydrogen phosphate, or dihydrogen phosphate. Other solid acid yielding compounds may be used. A combination of solid acid yielding compounds may be used. In one embodiment, the solid carbonate or bicarbonate compound may be selected from sodium, ammonium, or potassium carbonate and sodium, ammonium, or potassium bicarbonate. Other solid carbonates or bicarbonates may be used. A combination of solid carbonates and bicarbonates may be used. Additionally, the effervescent agents may contribute significantly to the overall plant nutrient composition provided in each formulation.

The biostimulant may include microorganisms, plant hormones, biosurfactants, and other compounds. Biostimulants may be naturally occurring or genetically modified microorganisms or may be substances derived from naturally occurring or genetically modified microorganisms. Microorganisms may be incorporated on a suspendible, water-insoluble or water-soluble substrate such as dextrose, clay, or any other dry, medium suitable for carrying said microorganisms. Bacteria including *Bacillus* spp., *Paenibacillus* spp., *Azotobacter* spp., or *Pseudomonas* spp may be incorporated into the DCEBN. Fungi including *Glomus* spp., *Paraglomus*, spp., *Gigaspora* spp., *Rhizopogon* spp., *Pisolithus* spp., *Suillus* spp., *Laccaria* spp., *Scleroderma* spp., *Saccharomyces* spp., or *Trichoderma* spp may be incorporated into the DCEBN. Existing formulations of microorganisms or biostimulants for gardening and agriculture may also be used in formulations of the DCEBN. The biostimulant and plant nutrient may be supplied together in the form of a blended biostimulant and nutrient fertilizer product. A blended biostimulant and nutrient fertilizer product may be water-soluble, water-insoluble or suspendible in liquid.

The plant nutrient may be a natural product such as solution grade fish meal, kelp powder, or other natural nutrient source. The plant nutrient may be processed to a particle size small enough to allow for suspension or dissolution in water and to avoid clogging irrigation systems, sprayers, hoses, hose fixtures, watering cans, and other applicators. Alternatively, the plant nutrient may be in synthetic form, such as ammonium nitrate, diammonium phosphate, potassium nitrate, urea, or any other synthetic plant nutrient. The plant nutrient may be in a readily water-soluble form or suspendible in liquid. The plant nutrient may include iron, calcium, sulfur, manganese, copper, zinc, boron, molybdenum, cobalt or other nutrients.

In some embodiments, the DCEBN may be packaged. In one example, the DCEBN may be portioned and filled into varying sized resealable bags. Alternatively, the DCEBN may be packed into small single-use packets that may be packed as individuals or filled into boxes of various quantities. The DCEBN may further be refined into pellets or manufactured into tablets that may be packed individually into single-use packets that may be packed as individuals or in boxes of various quantities. Alternatively, DCEBN may be packed into multi-celled register hanger cards, tubes, or other small display packaging. The DCEBN may also be packed into resealable bags of varying sizes. The packaging may be air tight and moisture sealed. The packaging may also include foil lidding with a PVC tray for the DCEBN.

FIG. 1 is a flow chart for a method 100 for fabricating a DCEBN in accordance with an embodiment. At steps 101-104, effervescent agent(s) 101, biostimulant(s) 102, plant nutrient(s) 103, and/or binding agents, lubricants, mediums or other ingredients 104 are collected. At step 105, the ingredients from steps 101-104 may be combined into a DCEBN. At step 106, the DCEBN may be processed to form meal, dry powder, pellets, tablets, or other dry form. At step 108, the DCEBN may be mixed or dissolved in a liquid, such as water or a water-based liquid, and at step 109 the resulting mixture may be applied to soil, seeds or plants or the like.

It is expressly noted that the steps in FIG. 1 may be performed in any order and certain steps may be omitted. For example, a commercially available DCEBN may be formed and packaged at step 107. The resulting mixture at step 108 and the application of the mixture at step 109 may occur at the time of application of the mixture to soil, seeds or plants or the like.

In some embodiments, the amount of effervescent agents including the solid carbonate or bicarbonate compound and a solid acid yielding compound may be between about 20% by mass to about 90% by mass. In some embodiments, the amount of biostimulant may be about 0.1% by mass to about 70% by mass. In some embodiments, the amount of plant nutrient may be about 10% by mass to about 80% by mass. In one embodiment, the amount of solid acid yielding compound may be about 2% by mass to about 55% by mass. In other embodiments, the amount of carbonate may be about 4% by mass to about 52% by mass. In other embodiments, the amount of bicarbonate may be about 6% by mass to about 60% by mass. In yet other embodiments, the amount of carbonate and bicarbonate in combination may be about 4% by mass to about 60% by mass.

Below are several examples of one or more embodiments of the invention for the DCEBN with any other ingredients described herein using the methods described in FIG. 1. Each of the percentages below is expressed in percentages by mass. In each example, a liquid, such as water or a water-based liquid, may be added to the DCEBN.

Example 1

25% Potassium Bicarbonate
25% Citric Acid
45% 20-20-20 (NPK) Nutrient Fertilizer
5% Bacteria and Trichoderma on Dextrose Example 2

25% Potassium Carbonate
25% Citric Acid
35% Ammonium Nitrate, Diammonium Phosphate, Potassium Nitrate, and Urea
10% Iron, Calcium, Sulfur, Manganese, Copper, Zinc, Boron, Molybdenum, and Cobalt
5% Plant Hormones and Biosurfactants Example 3

35% Sodium Bicarbonate
35% Citric Acid

25% 20-20-20 (NPK) Nutrient Fertilizer
5% Bacteria including *Bacillus* spp., *Paenibacillus* spp., *Azotobacter* spp., or *Pseudomonas* spp

Example 4

35% Potassium Bicarbonate
35% Citric Acid, Tartaric Acid, and Oxalic Acid
25% 20-20-20 (NPK) Nutrient Fertilizer
5% Fungi including *Glomus* spp., *Paraglomus*, spp., *Gigaspora* spp., *Rhizopogon* spp., *Pisolithus* spp., *Suillus* spp., *Laccaria* spp., *Scleroderma* spp., *Saccharomyces* spp., or *Trichoderma*

Example 5

25% Ammonium Bicarbonate
25% Citric Acid, Ammonium Bisulfate, Potassium Bisulfate, Monohydrogen Phosphate, and Dihydrogen Phosphate
40% 20-20-20 (NPK) Nutrient Fertilizer
10% Beneficial Microorganism Gardening Product

Example 6

15% Potassium Bicarbonate
10% Sodium Bicarbonate
25% Citric Acid
50% 20-20-20 (NPK) Nutrient Fertilizer with Biostimulant

Example 7

25% Potassium Bicarbonate
25% Citric Acid, Tartaric Acid, Oxalic Acid, Ammonium Bisulfate, Potassium Bisulfate, Monohydrogen Phosphate, and Dihydrogen Phosphate
40% Nitrogen Nutrient Fertilizer
10% Bacteria and Trichoderma on Dextrose

Example 8

25% Potassium Bicarbonate
20% Citric Acid, Tartaric Acid, Oxalic Acid, Ammonium Bisulfate, Potassium Bisulfate, Monohydrogen Phosphate, and Dihydrogen Phosphate
50% 20-20-20 Phosphorus and Nitrogen Nutrient Fertilizer
5% Bacteria and Trichoderma on Dextrose

Example 9

20% Potassium Bicarbonate
25% Citric Acid
50% Solution Grade Fish Powder Nutrient Fertilizer
5% Live Microorganisms, Plant Hormones, and Biosurfactants

Example 10

25% Potassium Bicarbonate
25% Citric Acid
40% All-Purpose Plant Food with Micro-Nutrients
5% Bacteria including *Bacillus* spp., *Paenibacillus* spp., *Azotobacter* spp., or *Pseudomonas* spp
5% Fungi including *Glomus* spp., *Paraglomus*, spp., *Gigaspora* spp., *Rhizopogon* spp., *Pisolithus* spp., *Suillus* spp., *Laccaria* spp., *Scleroderma* spp., *Saccharomyces* spp., or *Trichoderma*

In some embodiments, the components of the above examples may be combined with any variety of binders, lubricants, mediums, or other materials required for a stable, effervescent composition in dry form that may mix or dissolve in approximately five minutes or less when adding a liquid, such as water or a water-based liquid. In some embodiments, the composition in dry form may mix or dissolve in approximately one minute or less.

In one embodiment, the amount of liquid, such as water or water-based liquid, to mix or dissolve the dry composition may be approximately two ounces or more. In other embodiments, the DCEBN may be designed for mixing or dissolution in a volume of liquid substantially equivalent to a standard watering can, spray bottle, irrigation tank, or other applicator or receptacle used for agricultural or garden applications.

The foregoing description of the preferred embodiments of the present invention has been presented for purposes of illustration and description. It is not intended to be exhaustive or to limit the invention to the precise form or to the exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for"

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

The invention claimed is:

1. A dry composition, comprising:
   potassium bicarbonate, a solid acid yielding compound, and a microorganism, wherein the microorganism includes at least one selected from the group of *Glomus* spp., *Paraglomus* spp., *Gigaspora* spp., *Rhizopogon* spp., *Pisolithus* spp., *Suillus* spp., *Laccaria* spp., *Scleroderma* spp., and combinations thereof.

2. The dry composition of claim 1, wherein an amount of potassium bicarbonate is between about 4% by mass to about 60% by mass.

3. The dry composition of claim 1, wherein an amount of potassium bicarbonate and a solid acid yielding compound, is between about 20% by mass to about 90% by mass.

4. The dry composition of claim 1, further comprising at least one selected from the group of a carbonate compound, a bicarbonate compound, and combinations thereof.

5. The dry composition of claim 1 further comprising at least one selected from the group of sodium bicarbonate, ammonium bicarbonate, potassium carbonate, sodium carbonate, ammonium carbonate, and combinations thereof.

6. The dry composition of claim 1, wherein an amount of solid acid yielding compound is between about 2% by mass to about 55% by mass.

7. The dry composition of claim 1, wherein the solid acid yielding compound includes at least one selected from the group of citric acid, tartaric acid, oxalic acid, ammonium bisulfate, potassium bisulfate, monohydrogen phosphate, dihydrogen phosphate, and combinations thereof.

8. The dry composition of claim 1 further comprising a biostimulant.

9. The dry composition of claim 8, wherein the biostimulant includes at least one selected from the group of a microorganism, a plant hormone, a biosurfactant, and combinations thereof.

10. The dry composition of claim 1 further comprising a medium for carrying a microorganism, wherein the medium includes at least one selected from the group of clay, dextrose, and combinations thereof.

11. The dry composition of claim 1, wherein an amount of a microorganism is between about 0.1% by mass to about 70% by mass.

12. The dry composition of claim 1 further comprising a bacteria, wherein the bacteria includes at least one selected from the group of *Bacillus* spp., *Paenibacillus* spp., *Azotobacter* spp., *Pseudomonas* spp., and combinations thereof.

13. The dry composition of claim 1 further comprising a fungi, wherein the fungi includes at least one selected from the group of *Saccharomyces* spp., *Trichoderma* spp., and combinations thereof.

14. The dry composition of claim 1 further comprising a plant nutrient.

15. The dry composition of claim 14, wherein the plant nutrient includes at least one selected from the group a synthetic fertilizer, a natural fertilizer, a nitrogen fertilizer, a phosphorus fertilizer, a micro-nutrient, a combination fertilizer, ammonium nitrate, diammonium phosphate, potassium nitrate, urea, iron, calcium, sulfur, manganese, copper, zinc, boron, molybdenum, cobalt, a fish derivative, a kelp derivative, and combinations thereof.

16. The dry composition of claim 1 further comprising at least one selected from the group of a lubricant, a binding agent, a medium, and combinations thereof.

17. The dry composition of claim 1 further comprising at least one of a tablet, a powder, a meal, and a pellet.

18. The dry composition of claim 1 further comprising a package.

19. The dry composition of claim 18, wherein the package is at least one of airtight and moisture sealed.

20. The dry composition of claim 18, wherein the package comprises at least one of a bag, a resealable bag, a single-use packet, a box, a tube, a display package, a multi-celled package, a register hanger card, PVC, and foil.

\* \* \* \* \*